(12) United States Patent
Sterbling et al.

(10) Patent No.: US 12,462,024 B2
(45) Date of Patent: Nov. 4, 2025

(54) SAMPLING, TRACING, AND REQUEST PROCESSING SYSTEM

(71) Applicant: SAP SE, Walldorf (DE)

(72) Inventors: Sven Sterbling, Heidelberg (DE); Nicolas Schaefer, Mannheim (DE)

(73) Assignee: SAP SE, Walldorf (DE)

( * ) Notice: Subject to any disclaimer, the term of this patent is extended or adjusted under 35 U.S.C. 154(b) by 75 days.

(21) Appl. No.: 18/599,571

(22) Filed: Mar. 8, 2024

(65) Prior Publication Data

US 2025/0284798 A1 Sep. 11, 2025

(51) Int. Cl.
| | |
|---|---|
| *G06F 21/55* | (2013.01) |
| *G06F 11/30* | (2006.01) |
| *G06F 11/34* | (2006.01) |

(52) U.S. Cl.
CPC ........ *G06F 21/554* (2013.01); *G06F 11/3006* (2013.01); *G06F 11/3476* (2013.01); *G06F 11/3495* (2013.01); *G06F 2201/865* (2013.01); *G06F 2221/034* (2013.01)

(58) Field of Classification Search
CPC ............... G06F 21/554; G06F 11/3006; G06F 11/3476; G06F 11/3495
See application file for complete search history.

(56) References Cited

U.S. PATENT DOCUMENTS

| | | | |
|---|---|---|---|
| 11,200,138 B1 * | 12/2021 | Wu ..................... | G06F 11/3006 |
| 11,403,157 B1 | 8/2022 | Ross | |
| 11,516,308 B1 * | 11/2022 | Dubynskiy ......... | G06F 11/3476 |
| 11,609,811 B2 | 3/2023 | Ramanujan et al. | |
| 2005/0183068 A1 | 8/2005 | Cwalina et al. | |
| 2011/0246528 A1 | 10/2011 | Hsieh et al. | |
| 2016/0314005 A1 | 10/2016 | Greifeneder et al. | |
| 2019/0268355 A1 * | 8/2019 | Nisbet ................. | H04L 63/1425 |
| 2020/0033831 A1 * | 1/2020 | Tauschinsky .......... | G06N 20/20 |
| 2022/0291982 A1 | 9/2022 | Poghosyan et al. | |

(Continued)

OTHER PUBLICATIONS

IBM Cloud Education, "What is Distributed Tracing?", printed Aug. 21, 2023 from https://www.ibm.com/blog/distributed-tracing/, 9 pages, Oct. 15, 2021.

(Continued)

*Primary Examiner* — Hadi S Armouche
(74) *Attorney, Agent, or Firm* — Sterne, Kessler, Goldstein & Fox P.L.L.C.

(57) ABSTRACT

System, method, and various embodiments for a request processing system are described herein. An embodiment operates by determining a first sampling rate for each of multiple different types of requests being processed by a first computing landscape, and detecting a change in a performance of a first type of request. The first sampling rate for the first type of request is increased, and a second sampling rate for the first type of request for a second computing landscape responsive is also increased. Results of the tracing corresponding to the increased sampling rates are aggregated, and one or more differences between the first computing landscape and the second computing landscape are identified. An alert to reduce processing of the first type of request is generated based on the aggregated results and the identified one or more differences.

20 Claims, 3 Drawing Sheets

(56) References Cited

U.S. PATENT DOCUMENTS

2023/0252109 A1\* 8/2023 Harutyunyan ...... G06F 11/3452 706/45
2025/0004913 A1\* 1/2025 Czerninski .......... G06F 11/3612

OTHER PUBLICATIONS

Rothschaedl, Thomas, "Dynatrace PurePath 4 integrates OpenTelemetry and the latest cloud-native technologies and provides analytics and AI at scale," printed Aug. 21, 2023, from https://www.dynatrace.com/news/blog/dynatrace-extends-observability-for-opentelemetry-service-mesh-serverless-apps-with-purepath4-distributed-tracing/, 16 pages, Nov. 17, 2020.

\* cited by examiner

SAMPLING, TRACING, AND REQUEST PROCESSING SYSTEM

BACKGROUND

It can be helpful to trace the processing of requests by computing systems to detect whether the system is being attacked or to detect and resolve any other processing anomalies. As the number of requests grows, it becomes computationally infeasible to trace every single request. In these systems, some subset of the requests may be sampled for tracing. However, tracing based on sampling can produce new problems, in wasting computing resources by tracing requests which are non-problematic. Also, if any system anomalies are detected, the sampling results in less data being available for analysis, which may make the system anomaly even more difficult or even impossible to resolve and further propagate the problem.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a sampling, tracing, and request processing system.

It can be helpful to trace the processing of requests by computing systems to detect whether the system is being attacked or to detect and resolve any other processing anomalies. As the number of requests grows, it becomes computationally infeasible to trace every single request. In these systems, some subset of the requests may be sampled for tracing. However, tracing based on sampling can produce new problems, in wasting computing resources by tracing requests which are non-problematic. Also, if any system anomalies are detected, the sampling results in less data being available for analysis, which may make the system anomaly even more difficult or even impossible to resolve and further propagate the problem.

Figure 1:
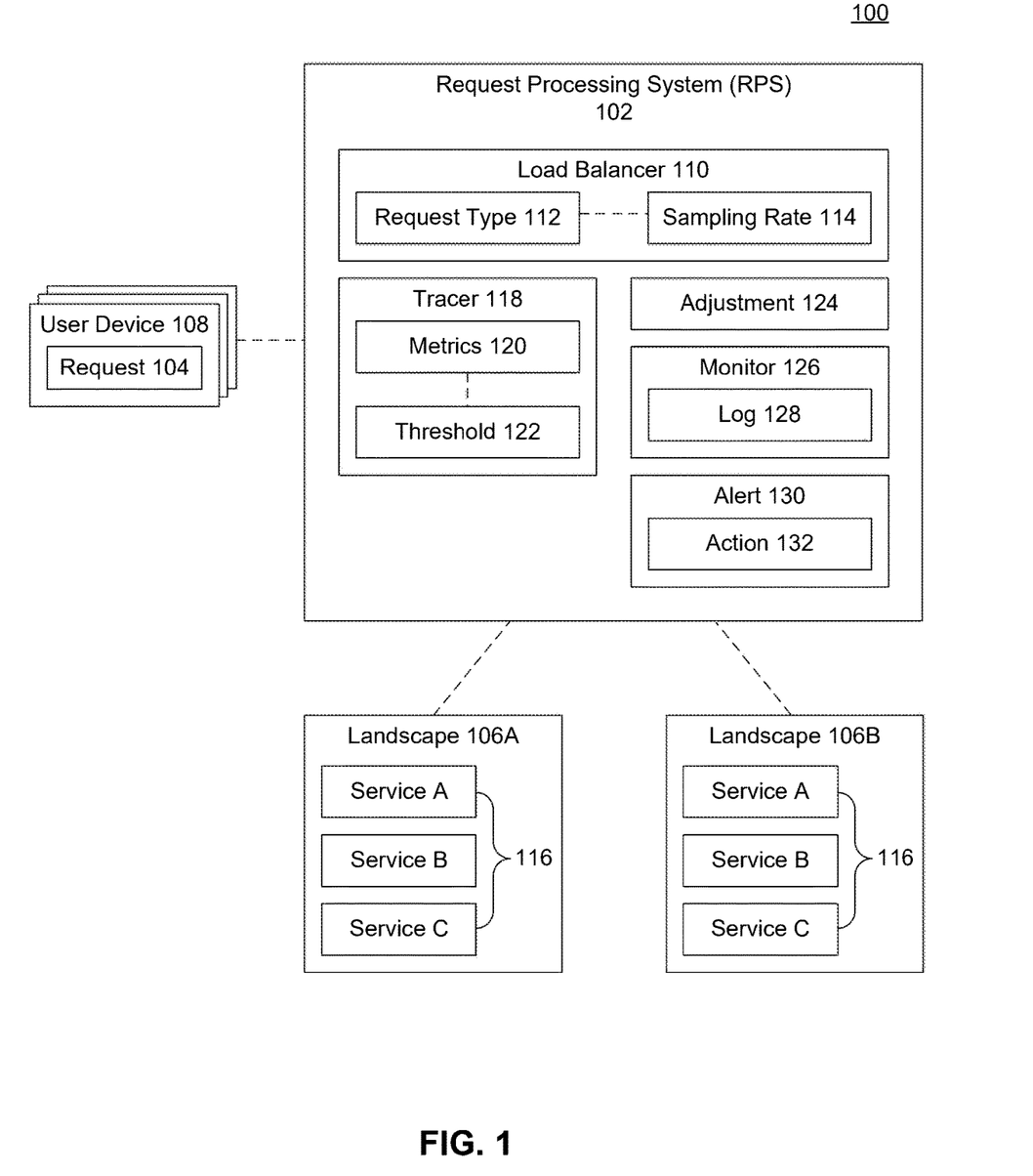
FIG. 1 is a block diagram illustrating example functionality for a request processing system (RPS), according to some embodiments.

FIG. 1 is a block diagram 100 illustrating example functionality for a request processing system (RPS) 102, according to some embodiments. RPS 102 may assign computing resources available for sampling to sample those requests 104 that are most beneficial for sampling. For example, RPS 102 may allocate or re-allocate limited computing resources to ensure the most relevant requests 104 are being selected/sampled for tracing. RPS 102 may identify what is causing a particular processing issue, and prevent the issue from spreading which would further degrade system performance and throughput. RPS 102 may improve the throughput and simplify troubleshooting the processing of requests 104, as well as preventing an identified problem from persisting or spreading.

In some embodiments, RPS 102 may detect issues with request processing across one or more computing landscapes 106A, 106B and perform actions that help to resolve or troubleshoot the problems. Some of these actions may include increasing the sample rate of requests, to generate more data that can be used in problem debugging and analysis. These actions may also include redirecting or pausing request processing, as well as preventing from further propagating and/or rolling back problem-causing system updates.

In some embodiments, RPS 102 may receive a request 104 from a user device 108 (which may include multiple different user devices 108, as illustrated). Request 104 may include any computing instruction, command, or request, which may include read and/or write requests. In some embodiments, request 104 may include multiple requests received from a single user device 108 or across multiple user devices 108.

User device 108 may include any computing device that is configured to generate or provide a request 104 to RPS 102. User device 108 may include a laptop, mobile phone, tablet, desktop, or other computing device. In some embodiments, request 104 may be transmit from user device 108 to RPS 102 over a network, such as the Internet. As illustrated, in some embodiments, multiple user devices 108 may simultaneously be providing one or more requests 104 to RPS 102.

In some embodiments, a request 104 may be received by a load balancer 110. Load balancer 110 may determine whether the request 104 is to be processed by computing landscape 106A or computing landscape 106B. The term landscape 106 may be used to refer generally to computing landscape 106A and/or computing landscape 106B. In some embodiments, requests 104 may be received directly by either of the landscapes 106, which may be configured with their own load balancers 110. These local load balancers 110 may then decide whether to process the request 104 locally on the receiving landscape 106, or whether to transfer the request to a different landscape 106. For simplicity only two landscapes 106 are illustrated, however in some embodiments, there could be more than two landscapes 106.

In some embodiments, the load balancer 110 may determine a request type 112 of the received request 104. As noted above, the requests 104 may include a variety of different request types 112 such as read or write requests, or requests or commands to perform a specific functionality or directed to a particular computing process or computing program. In other embodiments, there may be other or different request types 112.

In some embodiments, RPS 102 may perform tracing, such as distributed tracing, on the processing of a request 104 received from any of the user devices 108. Tracing may include a process of tracking how a request 104 is processed (e.g., which services 116 the request 104 uses, in which order, on which devices), while collecting data regarding the time and/or resources used to process the request 104.

However, performing tracing can be a resource intensive process in itself. Thus, not all the requests 104 may be traced. However, tracing can be beneficial to troubleshoot issues that may arise and/or to determine how to improve system functionality/request processing, so it is beneficial to trace at least some subset of requests 104.

RPS 102 may ensure the requests 104 which are selected for tracing (e.g. via sampling), are not all of the same request type 112, because if an issue arises with a different request type 112, there may not be enough data to detect and/or resolve the cause of the issue. RPS 102 may also perform tracing on the different landscapes 106, because it is possible that one of the landscapes 106A has issues processing a first type of request, but no issues in processing a second type of request, while landscape 106B is properly processing both request types 112. Thus, traces may be beneficial for both landscapes 106, across the various request types 112.

In some embodiments, RPS 102 may assign an initial sampling rate 114 to each request type 112. The sampling rate 114 may be set in any variety of ways. For example, if there are a set number of traces available (e.g., 100 traces per hour), each request type 112 may be assigned an equal number of traces (e.g., for four request types 112, the sampling rate 114 may be 25 traces/hour for each type 112).

In some embodiments, RPS 102 may assign the traces based on proportionality of how many of each request type 112 has been historically or is expected to be processed by the landscapes 106. For example, if there are three request types 112, and the first request type is expected to be 50% of the processed requests, the second type is expected to be 40% of the requests, and the third type is 10%, the 100 traces may be apportioned accordingly: 50, 40, 10. And these sampling rates 114 may be the same across landscapes 106 or may vary by landscape 106.

In some embodiments, the total number of traces performed may be based on some proportion of the number of requests that have been processed or are likely to be processed by the RPS 102. For example, the traces may be applied to 10% of the requests 104. Then, for example, if the system has processed 1000 requests/hour, then RPS 102 may select 100 requests/hour on which to perform traces.

In some embodiments, each landscape 106 may have or provide a set of services 116 which may be utilized in processing one or more of the request types 112. The services 116 may include applications, programs, or other functionality that may be requested or may be executed as part of processing a request 104. Example services 116 include, but are not limited to, an authentication service, database read, database write, video generation, data transformations, etc. In some embodiments, different requests 104 or different request types 112 may access only a subset of the available services 116. That is, each request 104 may not use every service 116.

In the example illustrated, both landscapes 106 may offer the same services (e.g., services A, B, C). In some embodiments, landscape 106B may include one or more different services from landscape 106A. For example, landscape 106B may include a service D (not shown) which is only used by a particular request type 112 that comprises only 1% of the total requests. Then, all requests that use service D may be processed by landscape 106B.

In some embodiments, a tracer 118 may perform the tracing of requests 104 as they are processed by landscapes 106A, 106B (in some embodiments, each landscape 106A, 106B may include its own local tracer 118). The tracer 118 may collect metrics 120 corresponding to the tracing and processing of various requests 104 selected for tracing by RPS 102.

Metrics 120 may include any statistics or other data that are collected from the tracing performed by tracer 118. In some embodiments, the metrics 120 may include the amount of resource consumption, the time it took to process a request 104 by each or a combination of services 116, and/or error codes or other intermediate output that may have been generated during the processing of a request 104, or other statistics, data, or information. In some embodiments, RPS 102 may calculate or receive a baseline range of expected performance or normal processing metrics 120 for each request type 112, which can vary by landscape 106.

Threshold 122 may indicate a range of normal or abnormal processing and/or malicious or anomalous processing, and may be generated based on metrics 120. For example, RPS 102 may collects metrics 120 for a period of time, and generate a range of normal processing (e.g., normal time or computing resources it takes to process a request 104 by each service 116 or a combination of services 116, or specific type of request 104, by one or more of the services 116). RPS 102 may then define or be provided a threshold 122 indicating that any request 104 that consumes more than the normal time or computing resources (e.g., beyond a threshold or range of normal processing) is to be deemed a malicious request or otherwise flagged as being abnormal or anomalous.

In some embodiments, threshold 122 may include a collection of values that signify thresholds. For example, threshold 122 may indicate that the average processing time for a request 104 is 10 seconds, 5 seconds and 3 seconds across services A, B, C, respectively, and that any request 104 that exceeds 11 seconds, 6 seconds, and 4 seconds, respectively is to be determined an abnormal request, or be indicative of abnormal processing.

In some embodiments, threshold 122 may further indicate that at least two of the three (or more than 50%) of the service thresholds may need to be exceeded for the processing to be determined as abnormal. For example, if a request 104 takes 13 seconds, 5 seconds, and 2 seconds, the processing may not be abnormal. Or, for example, threshold 122 may indicate that any request 104 causing any service 116 to exceed the threshold 122 for that service 116 may be enough to deem the processing as abnormal.

Once a request 104 (of a particular request type 112), or multiple requests 104 of the same type 112, is determined to consume more time or resources beyond threshold 122 number of requests for that request type 112 were deemed to be processed abnormally (e.g., requiring increased time and/or computing resources), RPS 102 may increase the sampling rate 114 for that request type 112 by an amount referred to as adjustment 124.

In a simple example, if there are four request types 112 (type 1, type 2, type 3, type 4), each assigned an initial sampling rate 114 of 25 traces, and RPS 102 detects that type 1 has exceeded threshold 122 on landscape 106A, RPS 102 may apply an adjustment 124 to the sampling rate 114 for one or more of the request types 112.

The adjustment 124 may include allocating additional resources to tracing, and increasing the number of traces available to the type 1 requests 104 by a set amount (e.g., 10 traces). In some embodiments, the adjustment 124 may include reducing the traces allocated one or more of the other request types 112 (type 2, type 3, type 4), and increasing the number of traces for type 1 for which the threshold 122 was exceeded, accordingly. The other request types may be each reduced by the same amount, or different request types 112 may include different priorities, and the lower the priority, the greater number of traces that may be allocated from that low priority request type to the anomalous request type. Any variety of combinations of techniques may be applied to calculate adjustment 124.

In some embodiments, adjustment 124 may be applied to both landscapes 106A and 106B, even though the threshold 122 was only exceeded for landscape 106A. In some embodiments, the adjustment 124 for landscape 106A may vary from the adjustment 124 for landscape 106B. The similarity in the adjustment 124 may be an increase in the sampling rate 114 for type 1 (the request type 112 for which the threshold 122 was exceeded).

In some embodiments, a monitor 126 may observe, record, or note any changes made to either or both of the landscapes 106 in a log 128. Monitor 126 may record or log events such as power failures, system crashes, device reboots, updates (including hardware, firmware and/or software), or other events in log 128.

After threshold 122 has been exceeded, monitor 126 may review a log 128 to determine what event(s) occurred prior to the time when threshold 122 was exceeded on landscape 106A. For example, monitor 126 may determine that the software for service B on landscape A was updated at time 1, and the threshold was exceeded at time 3 on landscape 106A, but not on landscape 106B. Monitor 126 may further determine that the same update is scheduled to be applied to landscape 106B at time 10.

In some embodiments, RPS 102 may generate an alert 130 including an action 132. The alert 130 may an electronic communication or notification (e.g. email, text, phone call, pop-up) directed to a user who is authorized to make changes to landscape 106A and/or landscape 106B. The alert 130 may include access to the traces from landscape 106A and 106B for type 1, as well as log 128, or an indication as to the differences between the landscapes 106A, 106B as determined by monitor 126.

Action 132 may include an action that has automatically been performed by RPS 102, an action to is scheduled to be performed by RPS 102 at a later time unless the user cancels the action, and/or an action that is recommended for the user to perform. For example, the action 132 may indicate the RPS 102 has cancelled or rescheduled to a later date/time the update which has been scheduled for landscape 106B, which monitor 126 identified as having been applied to landscape 106A prior to threshold 122 being exceeded. In some embodiments, alert 130 may allow user the option of rolling back the action taken by RPS 102 which the click of a link or button. In some embodiments, action 132 may recommend that the update be rolled back from landscape 106A, or indicate that RPS 102 has rolled back the update from service B on landscape 106A.

In some embodiments, action 132 may indicate that requests 104 that use service B are being diverted from landscape 106A to landscape 106B, or that requests 104 that use service B on landscape 106A have been paused.

In some embodiments, monitor 126 may receive a notification of an update to be scheduled on landscape 106A at time X. Then, for example, RPS 102 may generate an alert indicating that the number of traces for landscape 106A has been increased before time X and for a threshold period of time after time X, such that there may be more sampling data available if the update would cause any processing issues. In some embodiments, the alert 103 may provide a user the option of cancelling the increase in traces or change an adjustment 124 in the amount of increase and/or time of sampling increase.

Figure 2:
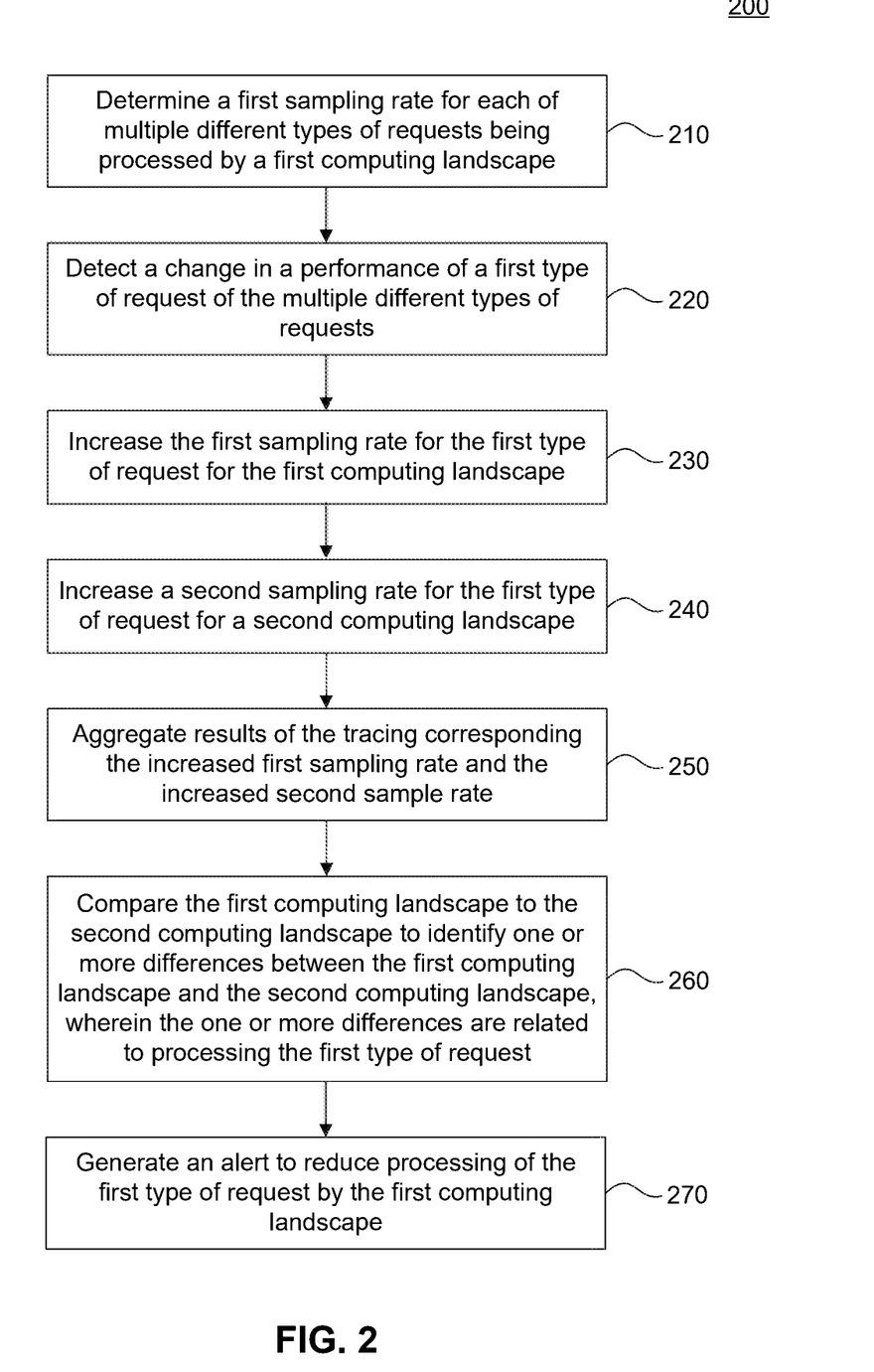
FIG. 2 is a flowchart illustrating example operations for providing a request processing system (RPS), according to some embodiments.

FIG. 2 is a flowchart 200 illustrating example operations for providing a request processing system (RPS) 102, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1.

In 210, a first sampling rate for each of multiple different types of requests being processed by a first computing landscape is determined. For example, RPS 102 may determine or assign a sampling rate 114 for each request type 112 for a variety of requests 104 that are being processed by landscapes 106. The sampling rate 114 may indicate a how many or which requests 104 of each request type 104 are being selected for tracing.

In 220, a change in a performance of a first type of request is detected on the first computing landscape based on the tracing. For example, RPS 102 may detect that the metrics 120 of a type 1 (request type 112) exceed a threshold 122 for type 1 request processing on landscape 106A. In some embodiments, the type 1 processing on landscape 106B may remain within threshold 122. While the examples described herein are primarily directed to detecting a change in performance, it would be understood by one skilled in the art, that the systems and processing described herein may be applicable to additional issues as well such as changes in request behavior, changes in status codes, authentication issues, etc.

In 230, the first sampling rate for the first type of request for the first computing landscape is increased responsive to detecting the change in the performance. For example, RPS 102 may apply an adjustment 124 that increases the sampling rate 114 for the type 1 request for landscape 106A.

In 240, a second sampling rate for the first type of request for a second computing landscape is increased responsive to the detecting the change in the performance. For example, RPS 102 may apply an adjustment 124 that increases the sampling rate 114 for the type 1 request for landscape 106B, even though the only anomaly in processing was detected for landscape 106A.

In 250, results of the tracing corresponding to the increased first sampling rate for the first computing landscape and the tracing corresponding to the increased second sample rate for the second computing landscape are aggregated for the first type of request. For example, RPS 102 may select and/or combine or organize the metrics 120 generated by tracer 118 for type 1 requests from both landscapes 106 both before and after the adjustment 124 was applied.

In 260, the first computing landscape is compared to the second computing landscape to identify one or more differences between the first computing landscape and the second computing landscape. For example, monitor 126 may review a log 128 that indicates the similarities and/or differences between the landscapes 106 (e.g. with regard to computing devices, manufacturers, hardware/firmware/software versions), as well as any updates that have been applied or events that have been detected which may affect processing, including replacing equipment.

In 270, an alert to reduce processing of the first type of request by the first computing landscape is generated, the alert comprising both the aggregated results and the identified one or more differences related to processing the first type of request. For example, RPS 102 may generate alert 130 with an action 132 and provide alert 130 to a user. The action 132 may recommend reducing the number of type 1 requests that are being processed by landscape 106A, by pausing the request processing for type 1 requests or instructing load balancer to divert some/all type 1 requests to landscape 106B, for a predetermined period of time or until the issue with landscape 106A has been resolved.

Figure 3:
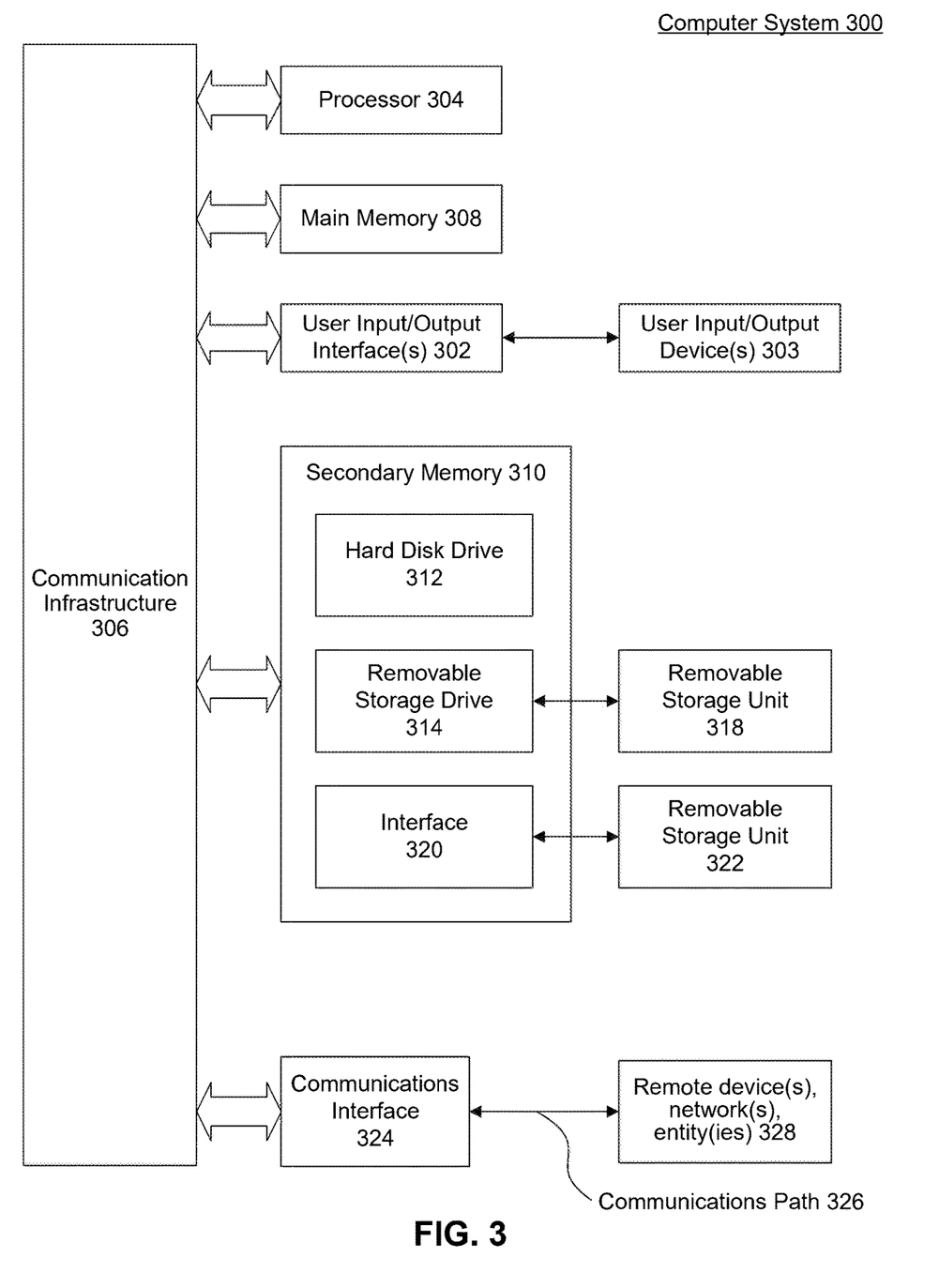
FIG. 3 is example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   determining a first sampling rate for each of multiple different types of requests being processed by a first computing landscape, wherein the first sampling rate corresponds to which requests of the multiple different types of requests are selected for tracing;
   detecting a change in a performance of a first type of request of the multiple different types of requests, on the first computing landscape based on the tracing;
   increasing the first sampling rate for the first type of request for the first computing landscape responsive to the detecting the change in the performance of the first type of request on the first computing landscape based on the tracing;
   increasing a second sampling rate for the first type of request for a second computing landscape responsive to the detecting the change in the performance of the first type of request on the first computing landscape based on the tracing;
   aggregating results of the tracing corresponding to the increased first sampling rate for the first computing landscape and the tracing corresponding to the increased second sampling rate for the second computing landscape, for the first type of request;
   comparing, based on the aggregated results of the tracing, the first computing landscape to the second computing landscape to identify one or more differences between the first computing landscape and the second computing landscape, wherein the one or more differences are related to processing the first type of request; and
   generating an alert to reduce processing of the first type of request by the first computing landscape, the alert comprising both the aggregated results and the identified one or more differences related to processing the first type of request.

2. The method of claim 1, wherein the increasing the first sampling rate for the first type of request for the first computing landscape comprises:
   decreasing a sampling rate by a corresponding amount for one or more other multiple types of requests.

3. The method of claim 1, wherein the comparing comprises determining that there was an update applied to the first computing landscape prior to detecting the change in the performance.

4. The method of claim 3, further comprising:
   determining that the update was scheduled to be applied to the second computing landscape at a later time.

5. The method of claim 1, wherein the alert comprises cancelling the update to be applied to the second computing landscape.

6. The method of claim 1, wherein the alert comprises rescheduling the update to be applied to the second computing landscape to an even later time.

7. The method of claim 1, further comprising:
   receiving a command to roll back the update to the first computing landscape responsive to generating the alert; and
   rolling back the update to the first computing landscape responsive to receiving the command.

8. The method of claim 1, further comprising:
   redirecting one or more requests of the first type of request received by the first computing landscape to the second computing landscape for processing, responsive to the detecting the change in the performance.

9. A system comprising:
   a memory; and
   at least one processor coupled to the memory and configured to perform operations comprising:
   determining a first sampling rate for each of multiple different types of requests being processed by a first computing landscape, wherein the first sampling rate corresponds to which requests of the multiple different types of requests are selected for tracing;
   detecting a change in a performance of a first type of request of the multiple different types of requests, on the first computing landscape based on the tracing;
   increasing the first sampling rate for the first type of request for the first computing landscape responsive to the detecting the change in the performance of the first type of request on the first computing landscape based on the tracing;
   increasing a second sampling rate for the first type of request for a second computing landscape responsive to the detecting the change in the performance of the first type of request on the first computing landscape based on the tracing;
   aggregating results of the tracing corresponding to the increased first sampling rate for the first computing landscape and the tracing corresponding to the increased second sampling rate for the second computing landscape, for the first type of request;

comparing, based on the aggregated results of the tracing, the first computing landscape to the second computing landscape to identify one or more differences between the first computing landscape and the second computing landscape, wherein the one or more differences are related to processing the first type of request; and generating an alert to reduce processing of the first type of request by the first computing landscape, the alert comprising both the aggregated results and the identified one or more differences related to processing the first type of request.

10. The system of claim 9, wherein the increasing the first sampling rate for the first type of request for the first computing landscape comprises:

decreasing a sampling rate by a corresponding amount for one or more other multiple types of requests.

11. The system of claim 9, wherein the comparing comprises determining that there was an update applied to the first computing landscape prior to detecting the change in the performance.

12. The system of claim 11, the operations further comprising:

determining that the update was scheduled to be applied to the second computing landscape at a later time.

13. The system of claim 9, wherein the alert comprises cancelling the update to be applied to the second computing landscape.

14. The system of claim 9, wherein the alert comprises rescheduling the update to be applied to the second computing landscape to an even later time.

15. The system of claim 9, the operations further comprising:

receiving a command to roll back the update to the first computing landscape responsive to generating the alert; and rolling back the update to the first computing landscape responsive to receiving the command.

16. The system of claim 9, the operations further comprising:

redirecting one or more requests of the first type of request received by the first computing landscape to the second computing landscape for processing, responsive to the detecting the change in the performance.

17. A non-transitory computer-readable medium having instructions stored thereon that, when executed by at least one computing device, cause the at least one computing device to perform operations comprising:

determining a first sampling rate for each of multiple different types of requests being processed by a first computing landscape, wherein the first sampling rate corresponds to which requests of the multiple different types of requests are selected for tracing;

detecting a change in a performance of a first type of request of the multiple different types of requests, on the first computing landscape based on the tracing;

increasing the first sampling rate for the first type of request for the first computing landscape responsive to the detecting the change in the performance of the first type of request on the first computing landscape based on the tracing;

increasing a second sampling rate for the first type of request for a second computing landscape responsive to the detecting the change in the performance of the first type of request on the first computing landscape based on the tracing;

aggregating results of the tracing corresponding to the increased first sampling rate for the first computing landscape and the tracing corresponding to the increased second sampling rate for the second computing landscape, for the first type of request;

comparing, based on the aggregated results of the tracing, the first computing landscape to the second computing landscape to identify one or more differences between the first computing landscape and the second computing landscape, wherein the one or more differences are related to processing the first type of request; and generating an alert to reduce processing of the first type of request by the first computing landscape, the alert comprising both the aggregated results and the identified one or more differences related to processing the first type of request.

18. The non-transitory computer-readable medium of claim 17, wherein the increasing the first sampling rate for the first type of request for the first computing landscape comprises:

decreasing a sampling rate by a corresponding amount for one or more other multiple types of requests.

19. The non-transitory computer-readable medium of claim 17, wherein the comparing comprises determining that there was an update applied to the first computing landscape prior to detecting the change in the performance.

20. The non-transitory computer-readable medium of claim 19, the operations further comprising:

determining that the update was scheduled to be applied to the second computing landscape at a later time.

* * * * *